US006314187B1

(12) United States Patent
Menkhoff et al.

(10) Patent No.: US 6,314,187 B1
(45) Date of Patent: Nov. 6, 2001

(54) METHOD FOR ENCRYPTION OR DECRYPTION USING FINITE GROUP OPERATIONS

(75) Inventors: Andreas Menkhoff, Munich; Franz-Otto Witte, Emmendigen, both of (DE)

(73) Assignee: Micronas Intermetall GmbH, Freiburg (DE)

(*) Notice: Subject to any disclaimer, the term of this patent is extended or adjusted under 35 U.S.C. 154(b) by 0 days.

(21) Appl. No.: 09/129,499

(22) Filed: Aug. 5, 1998

(30) Foreign Application Priority Data

Aug. 5, 1997 (DE) ..................................... 197 33 829

(51) Int. Cl.[7] ..................................... H04L 9/28
(52) U.S. Cl. ..................................... 380/28
(58) Field of Search ..................................... 380/28

(56) References Cited

U.S. PATENT DOCUMENTS 4,165,444 8/1979 Gordon .
4,797,921 1/1989 Shiraishi .
4,890,252 * 12/1989 Wang ..................................... 364/717

OTHER PUBLICATIONS

Bruce Schneier, Applied Cryptology, 254–255, chapter 17, Oct. 1994.*

Robert McEliece, Finite Fields for Computer Scientist and Engineers chapter 6, 7, 8, 1987.*

Neal Koblitz, Algebraic Aspects of Cryptology, Springer–Verlag 55–64, 1991.*

Bernard Sklar, Digital Communications, Prentice Hall, pp. 290298, 1988.*

Schneier, "Angewandte kryptographie", Addison–Wesley Publishing Company, pp. 434–435, 1996 (with Prior Art Statement attached).

Sklar, "Digital Communications", Prentice Hall, Englewood Cliffs, New Jersey, Channel Coding: Part 1, Chap. 5, pp. 290–298, 1988.

Copy of German Search Report for 197 33 829, dated Mar. 31, 1998.

Bruche Schneier, "Applied Cryptography", 1996, USA Chapter 17, "Other Stream Ciphers and Real Random–Sequence Generators", pp. 397, 398,420.

Karmel M. Shaheen, "Code Bond Cipher System", Proceedings Of The Annual International Carnahan Conference On Security Technology, USA, IEEE, Oct. 12, 1994, pp. 68–70.

D.E. Knuth, "The Art Of Computer Programming. vol. 2/Seminumerical Algorithms . . . " 1980, USA, pp. 31,32.

M. Mihaljevic et al, "A Fast And Secure Stream Cipher Based On Cellular Automata Over GF (Q)", IEEE Global Telecommunications Conference, USA, NY IEEE, 1998, pp. 3250–3255.

European Search Report, EP 98113474, Oct. 2, 2000.

* cited by examiner

*Primary Examiner*—Gail Hayes
*Assistant Examiner*—James Seal
(74) *Attorney, Agent, or Firm*—Duane Morris LLP

(57) ABSTRACT

The invention relates to a method for encrypting or decrypting a sequence of successive data words in a data communications device, the method comprising executing an algorithm in which a sequence of quasi-random encryption words is generated from predetermined start values by performing operations in a finite group, and in which a respective one of the encryption words is combined with a respective one of the data words.

5 Claims, 3 Drawing Sheets

METHOD FOR ENCRYPTION OR DECRYPTION USING FINITE GROUP OPERATIONS

FIELD OF INVENTION

This invention relates to a method for encrypting or decrypting a sequence of successive data words of length M in a data communications device.

BACKGROUND OF INVENTION

From Berhard Sklar, "Digital Communications" Prentice Hall, Englewood Cliffs, N.J., 1988, page 290 et seq., an encryption method is known in which encoding is performed by means of a shift register. This method has the disadvantage that the encoding technique can be easily discovered, so that the encoded data can be easily decrypted.

Furthermore, the so-called RC-4 algorithm is known, in which quasi-random encryption words are generated by performing different arithmetic operations. This algorithm has the disadvantage that a great amount of storage space is necessary for good encryption.

The object of the invention is to provide a method for encrypting or decrypting a data sequence which is difficult to decrypt, does not require much storage space, and can be implemented on silicon at low cost.

SUMMARY OF INVENTION

A method for encrypting or decrypting a sequence of successive data words of length M in a data communications device, including executing an algorithm in which a sequence of quasi-random encryption words of length M is generated from predetermined start values by performing operations in a finite group GF($2^N$), and in which a respective one of the encryption words is combined with a respective one of the data words.

DETAILED DESCRIPTION OF INVENTION

Figure 1:
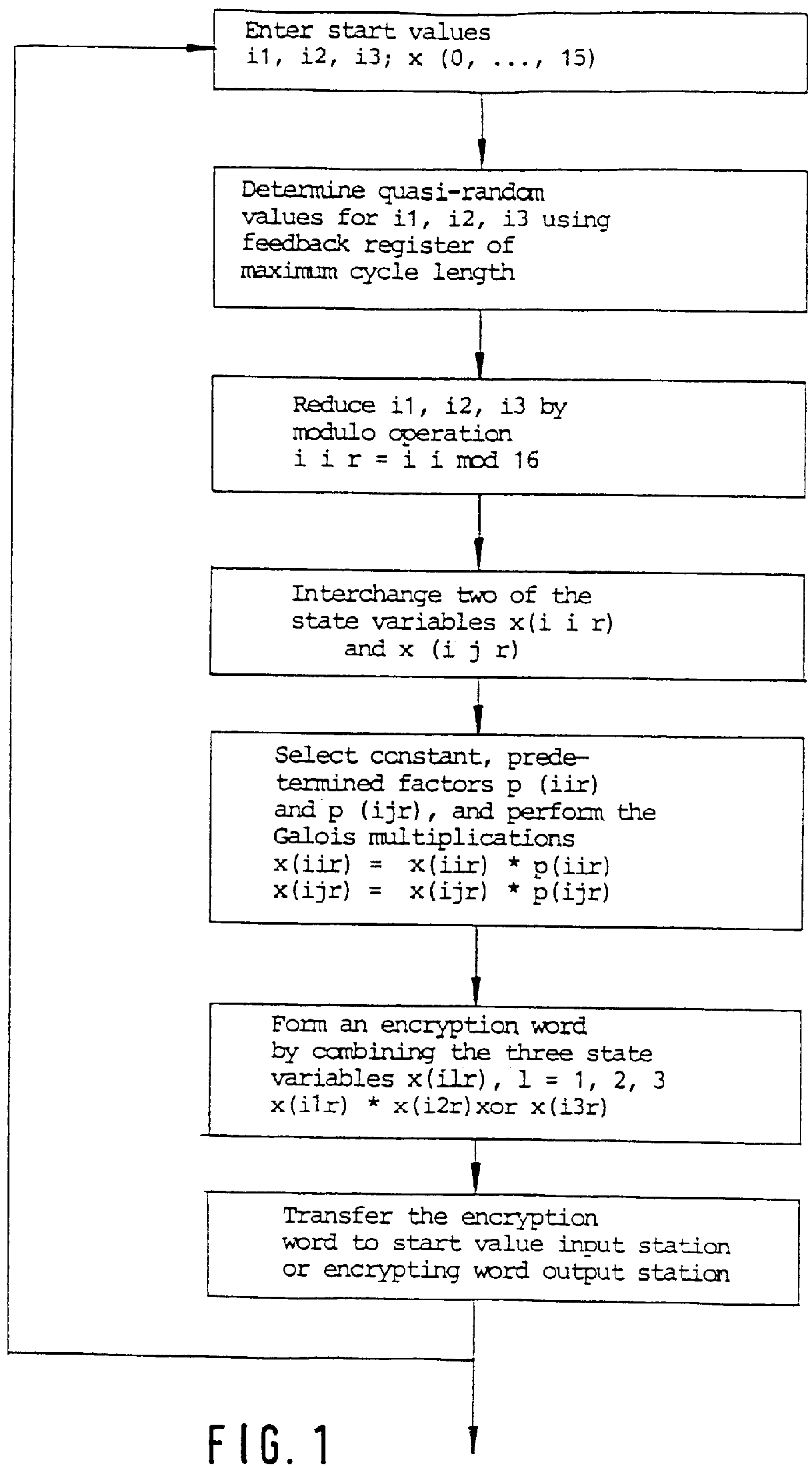
FIG. 1 is a flowchart showing the steps of an algorithm according to the invention for determining encryptions words.

The object is attained by a method for encrypting or decrypting a sequence of successive data words of length M in a data communications device, said method comprising executing an algorithm in which a sequence of quasi-random encryption words of length M is generated from predetermined start values by performing operations in a finite group GF($2^N$), and in which a respective one of the encryption words is combined with a respective one of the data words.

Since quasi-random encryption words are generated by performing operations in a finite system, for example, Galois Fields or Galois groups, a high degree of security is provided if the key is not known. On the one hand, the key cannot be deduced from the data sequence itself, since the encryption words were generated in a quasi-random manner. Even if the algorithm is known, the key cannot be learned form the encrypted data words at justifiable expense. On the other hand, the method using finite-group arithmetic, also called Galois arithmetic, can be implemented in hardware, namely on a processor. Thus, use can be made of existing hardware components, such as a Reed-Solomon decoder. As existing hardware components can be used, the cost and complexity of the data communication device can be kept low. Furthermore, storage space can be reused, i.e., it can be used for other tasks. One application for such a data communication device is in a broadcast transmitting or receiving station.

Advantageously, the length M of the data words is equal to the dimension N of the finite group. This allows the algorithm to be implemented by simple operations. It is also advantageous if the algorithm is based on a finite group of R state variables x and R constant, predetermined factors p which are addressed by L indices, with L being less than R. Advantageously, the algorithm is cycled through, with one encryption word being generated per cycle. By the combination of state variables and constant, predetermined factors sufficient randomness of the encryption words is achieved and, on the other hand, storage space is saved.

In a preferred embodiment of the invention, L=3, and three state variables x are selected by the three indices in a quasi-random manner, and the encryption word is formed by combining the selected state variables x, and is used only for the combination with the respective data word. Since the state variables are not subsequently used in the method, and thus are not stored, retracing techniques are not effectively usable for finding the state variable. This provides additional, high security against decryption.

Advantageously, two of the state variables are selected by being interchanged and subsequently multiplied by constant factors p(i) given by the indices of the state variables x(i), with different ones of the predetermined constant factors p(i) being selected per cycle in a quasi-random manner as a result of the Galois arithmetic.

In another preferred embodiment of the invention, values for the indices are determined by shifting the sequence of indices through a clocked feedback shift register of maximum cycle length. A quasi-random sequence of indices is thus generated in a simple manner. The number of indices i for addressing the state variables x(i) may be limited by a modulo operation to the number predetermined for the addressing. In this manner, quasi-random noise is generated, so that the indices i used to address the state variables are quasi-randomly uniformly distributed.

According to a further advantageous aspect of the invention, the start values for the state variables x and the indices i for the algorithm are uniquely determined by means of an initialization method. Advantageously, the start values are generated from predetermined initialization values k in a quasi-random manner by performing operations in a finite group GF($2^Q$). As a result, quasi-random start values are entered into the algorithm, so that the probability that the key can be deduced from the encrypted data words or that the data words can be decrypted without knowledge of the input values is further reduced.

The initialization values k may enter into the operations for determining the start values with a constant weight. This ensures that no statistically nonuniform distribution occurs in the initial distribution of the start values, which would render the encryption method more vulnerable to attack. To determine the start values for the state variables x, a multiplication by a respective one of the constant factors p(i)

may be performed. The start values of the indices may be determined by combining constant-weight initialization values k with a state variable x or one of the constant factors p(i). The start values of the indices may be limited by a modulo operation to the number predetermined for the algorithm.

The invention will now be explained in greater detail with reference to the accompanying drawings.

In the following, one embodiment of an algorithm according to the invention for generating encryption words with which a sequence of successive data words can be encrypted or decrypted will be explained with the aid of FIG. 1. The algorithm according to the invention is implemented in a finite group, i.e., in a Galois field.

In the embodiment shown, the algorithm is based on 16 state variables x and 16 constant, predetermined factors p which are addressed by three indices i. The algorithm is cycled through, with one encryption word being generated per cycle. The numbers of state variables, constant factors, and indices are given by way of example, and it is within the discretion of those skilled in the art to use suitable other numbers.

First, start values i1, i2, i3 for the indices and x(0, . . . 15) for the state variables are entered. Then, values for the indices i1, i2, i3 are determined in a quasi-random manner by shifting the sequence of indices through a clocked feedback shift register of maximum cycle length. Through the selection of the indices by means of the shift register, a quasi-random sequence of numbers is formed which changes on each shift of the shift register. This operation is nonlinear and generates quasi-random noise. In the next step, the number of values of the indices i1, i2, i3 is reduced to 16 by a modulo-operation in the Galois field. This is the number required to address the state variables x(Ii).

Two of the state variables, x(i2r), x(i3r), are addressed by means of the reduced indices and then interchanged, so that the random share in the method is increased. The state variables so obtained, x(i2r) and x(i3r), are combined with constant factors p(i2r) and p(i3r), respectively, by Galois multiplication. This results in a progressive modification of the state variables, which is essential for the statistical distribution of the encryption words. The constant factors are predetermined array elements and are thus stored in a fixed memory location. The constant factors p are selected by the indices iir, which are assigned to the state variables.

Next, an encryption word is formed by combining the state variables x(i2r), x(i3r) with one another and with a further state variable x(i1r) which is quasi-randomly selected by an index I. The encryption word so formed is passed to the station for entering start values, and is the cycle is repeated. The whole cycle is repeated until all possible states of the indices i1, i2, i3, i.e., all states of the maximum sequence, have been cycled through by means of shift register. When all states have been cycled through, a quasi-random encryption word has been formed, which is output for encrypting or decrypting a word of a data sequence. After that, the next encryption word is formed correspondingly by executing the algorithm again. In this manner, a sequence of quasi-random encryption words is obtained, each of which can be combined with a respective one of the words of a data sequence. As a result of the quasi-random scrambling of the encryption words, the encryption method provides a high degree of security. It is not possible to deduce the key from the result of the encrypted data at justifiable expense. Retracing the formation of the data words is more complicated than trying all possible keys. Even if the algorithm or the generator containing the algorithm is known, the key is not predictable on the basis of the encrypted data. Even if the algorithm is known, the sequence of encryption words is not predictable. The method thus provides a high degree of security.

Figure 2:
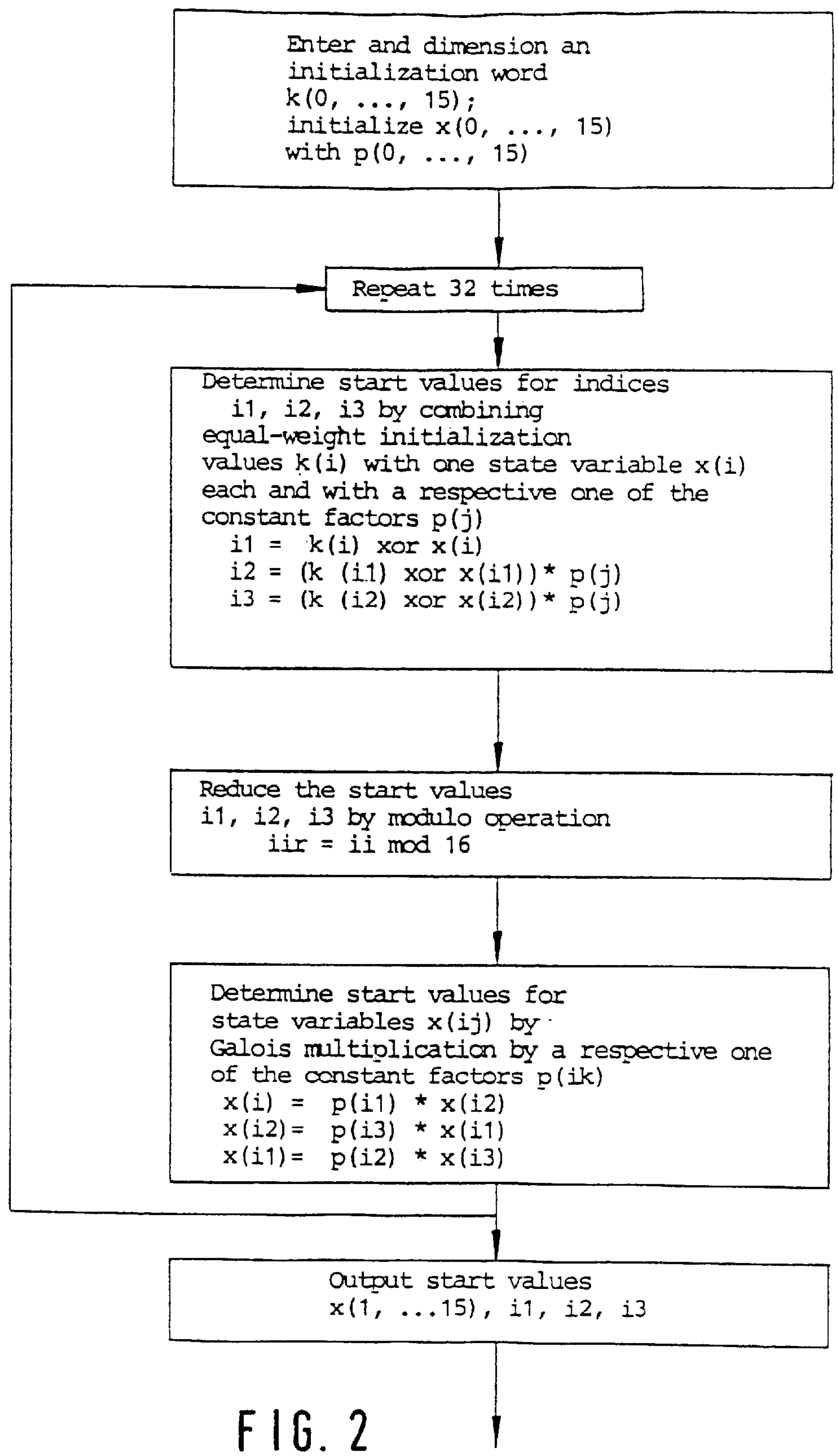
FIG. 2 is a flowchart showing the steps of an initialization method with which start values for the algorithm of FIG. 1 are determined in accordance with the invention.

In the following, it will be described with the aid of FIG. 2 how the start values x, i1, i2, i3 for the algorithm described in connection with FIG. 1 are determined. The algorithm of the initialization procedure is executed in a finite group or Galois field using Galois operations.

First, an initialization word k is entered, which may be dimensioned to k(0, . . . , 15). Then, start values are determined for the indices i1, i2, i3. To determine the index i1, one of the start values k(I) and one of the state variables x(I) are selected at random and combined. To determine the index i2, a start value k(i1) and a state variable x(i1) are selected, combined with one another, and combined with a randomly selected constant factor p(j). To determine the index i3, a start value k(i2) and a state variable x(i2) are selected, combined with one another, and combined with a randomly selected constant factor p(k). The constant factors are selected from values stored in a memory location. They may be the same stored values as those for the algorithm of the encryption method. Next, the start values of the indices i1, i2, i3 are each limited to the number predetermined for the algorithm, 16, using a modulo operation. It is essential that the initialization values k enter into the operations for determining the start values with a constant weight. This prevents a statistical disequilibrium in the initial distribution, which would result in the key being easier to deduce.

The start values for the state variable x are determined by multiplying a respective constant factor p(ii), selected by means of the start values for the indices, by a state variable x(ij), selected at random by means of the start values for the indices, the multiplication being performed in the Galois field. After the initialization method, the start values are output for input to the algorithm for carrying out the encryption method.

Figure 3:
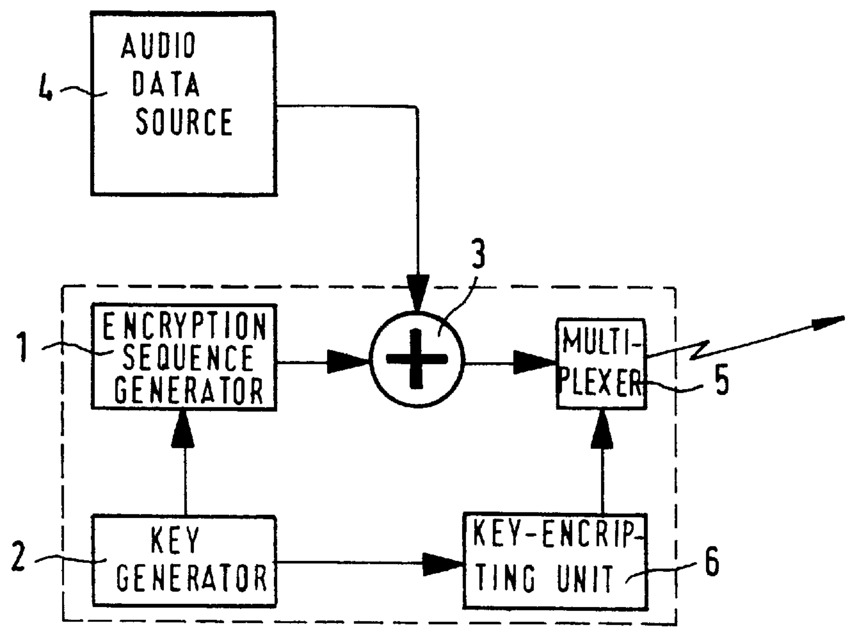
FIG. 3 shows a facility in which the method for encrypting a data sequence in accordance with the invention is used.

FIG. 3 shows one embodiment of a facility for carrying out the method for encrypting a sequence of successive data words in accordance with the invention. Both the initialization method and the algorithm are carried out in an encryption sequence generator 1. A key generator 2 generates key words which are supplied to the encryption sequence generator 1. These are entered as initialization words into the encryption sequence generator 1. The latter provides a sequence of encryption words which are fed to a combining unit 3. The combining unit 3 also receives data words from an audio data source 4. In the combining unit 3, a respective one of the data words and a respective one of the encryption words are combined. This can be done using an XOR operation. The encrypted data words are then fed to a multiplexer 5 in which further key data are superimposed on them. The further key data come from a key-encrypting unit 6 which receives the key data from the key generator 2 for further encryption. The multiplexer 5 sends out the encrypted data words.

Figure 4:
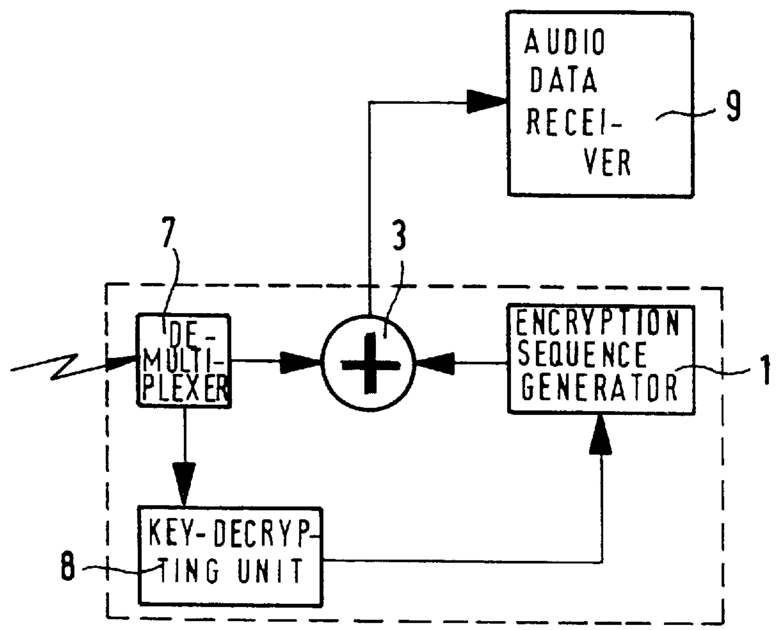
FIG. 4 shows a facility in which the method for decrypting a data sequence in accordance with the invention is used.

FIG. 4 shows how the data words encrypted by the transmitting facility of FIG. 3 can be received and decrypted. The receiving facility of FIG. 4 is constructed essentially symmetrically with respect to the facility of FIG. 3. A demultiplexer 7 separates the data words into the encrypted key words, which are fed to a key-decrypting unit 8, and the data words encrypted with the encryption words, which are fed to the combining unit 3. The key-decrypting unit 8 separates the encrypted key words from the applied data and passes them to the encryption sequence generator 1. In the latter, the initialization method and the algorithm for decrypting the data sequence are carried out. The encryption sequence generator 1 determines the encryption words and passes them to the combining unit 3, where the data stream coming from the multiplexer is decoded, and the data words are passed to the audio data receiver 9.

What is claimed is:

1. A method for encrypting or decrypting a sequence of successive data words of length M in a data communications device, comprising executing an algorithm in which a sequence of quasi-random encryption words of length M is generated from predetermined start values by performing operations in a finite group $GF(2^N)$, and in which a respective one of the encryption words is combined with a respective one of the data words, wherein the algorithm is based on a Galois field of R state variables x and R constant, predetermined factors p which are addressed by L indices I, with L<R wherein the start values for the state variables x and the indices I for the algorithm are uniquely determined by means of an initialization method wherein the start values are generated from predetermined initialization values k in a quasi-random manner by performing operations in a finite group $GF(2^Q)$.

2. A method for encrypting or decrypting a sequence of successive data words of length M in a data communications device, comprising executing an algorithm in which a sequence of quasi-random encryption words of length M is generated from predetermined start values by performing operations in a finite group $GF(2^N)$, and in which a respective one of the encryption words is combined with a respective one of the data words, wherein the algorithm is based on a Galois field of R state variables x and R constant, predetermined factors p which are addressed by L indices I, with L<R wherein the start values for the state variables x and the indices I for the algorithm are uniquely determined by means of an initialization method, wherein the initialization values k enter into the operations for determining the start values with a constant weight.

3. A method for encrypting or decrypting a sequence of successive data words of length M in a data communications device, comprising executing an algorithm in which a sequence of quasi-random encryption words of length M is generated from predetermined start values by performing operations in a finite group $GF(2^N)$, and in which a respective one of the encryption words is combined with a respective one of the data words, wherein the algorithm is based on a Galois field of R state variables x and R constant, predetermined factors p which are addressed by L indices I, with L<R wherein the start values for the state variables x and the indices I for the algorithm are uniquely determined by means of an initialization method, wherein, to determine the start values for the state variables x, a respective one of the state variables x(j) is multiplied by a respective one of the constant factors p(I).

4. A method for encrypting or decrypting a sequence of successive data words of length M in a data communications device, comprising executing an algorithm in which a sequence of quasi-random encryption words of length M is generated from predetermined start values by performing operations in a finite group $GF(2^N)$, and in which a respective one of the encryption words is combined with a respective one of the data words, wherein the algorithm is based on a Galois field of R state variables x and R constant, predetermined factors p which are addressed by L indices I, with L<R wherein the start values for the state variables x and the indices I for the algorithm are uniquely determined by means of an initialization method, wherein the start values of the indices I are determined by combining constant-weight initialization values k with a state variable x or on of the constant factors p(I).

5. A method for encrypting or decrypting a sequence of successive data words of length M in a data communications device, comprising executing an algorithm in which a sequence of quasi-random encryption words of length M is generated from predetermined start values by performing operations in a finite group $GF(2^N)$, and in which a respective one of the encryption words is combined with a respective one of the data words, wherein the algorithm is based on a Galois field of R state variables x and R constant, predetermined factors p which are addressed by L indices I, with L<R wherein the start values for the state variables x and the indices I for the algorithm are uniquely determined by means of an initialization method, wherein the start values of the respective indices are limited by a modulo operation to the number predetermined for the algorithm.

* * * * *